United States Patent Office 2,881,996
Patented Apr. 14, 1959

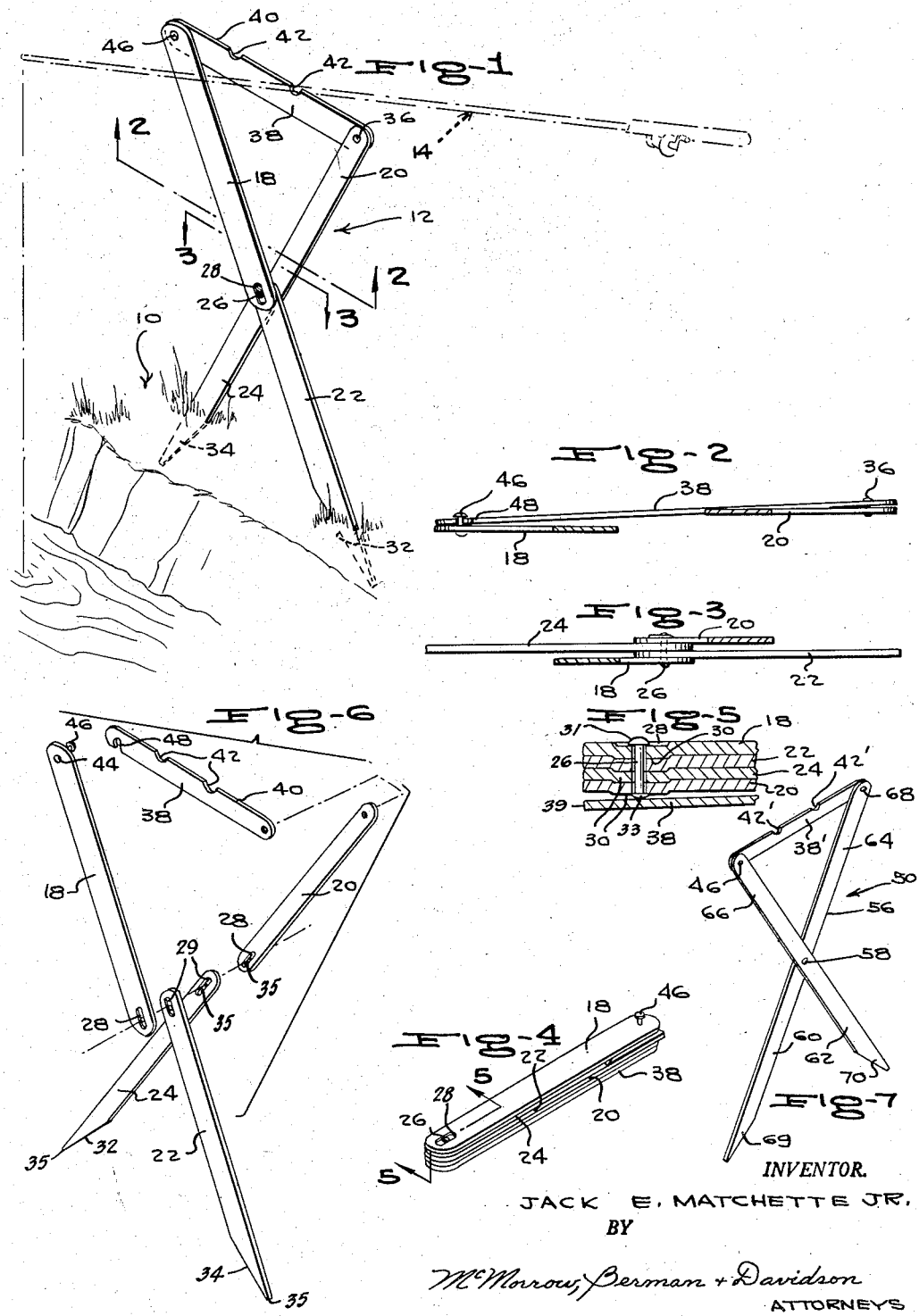

2,881,996

FOLDABLE FISH POLE SUPPORT

Jack E. Matchette, Jr., Greenville, Ohio, assignor of one-half to Nelson Jack Matchette, Sr., Greenville, Ohio Application August 24, 1956, Serial No. 606,077

2 Claims. (Cl. 248—46)

This invention relates generally to improved foldable supports for such as fishing rods.

When fishing from the bank of a stream, for example, it is often desirable to cast or throw a line into a stream and then rest the rod transversely on a suitable support.

A primary object of the invention is to provide practical and efficient supports of the character indicated, which are easily folded and unfolded, and are compact when folded for transportation in such as a tackle box.

Another object of the invention is to provide supports of the character indicated which can be made in attractive, rugged, and serviceable forms at relatively low cost, are easily used, and are highly satisfactory, practical, and acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a perspective view of one form of support in accordance with the present invention, showing the same installed on a stream bank, a fishing rod in phantom lines being shown supported thereon;

Figure 2 is a horizontal sectional view taken substantially on line 2—2 of Figure 1;

Figure 3 is a horizontal sectional view taken substantially on line 3—3 of Figure 1;

Figure 4 is a perspective view showing the support in its folded condition;

Figure 5 is an enlarged fragmentary transverse sectional view taken substantially on line 5—5 of Figure 4;

Figure 6 is an exploded perspective view of the support; and

Figure 7 is a perspective view of another form of the invention.

Referring to the drawings in detail, and first to Figures 1 to 6 thereof, a stream bank, indicated generally at 10, is shown in which is installed a support 12, over which a fishing rod 14 is laid.

The support 12 comprises a pair of upper downwardly converging arms 18 and 20, and a pair of downwardly divergent legs 22 and 24. Formed in the lower ends of the arms and in the upper ends of the legs are longitudinal grooves 28 and 29, respectively, which are traversed by a single pivot pin 26 having enlarged heads 31 and 33 on its ends, the pin 26 being journalled through holes 35 located intermediate the ends of the grooves.

The grooves 28, 29 are formed in the legs and arms so that they indent one side thereof and produce registered longitudinal ribs 30 on the other sides of the legs and arms. In the unfolded condition of the support 12, the ribs retainably engage in the grooves 28 and 29 of adjacent arm and leg ends, whereby the legs and arms are releasably held in their extended position. The ribs can be disengaged from the related grooves only by exerting sufficient angular force to flex the arm and leg ends concerned so as to dislodge the related ribs from the grooves, separation of related pivoted ends of legs and arms being prevented by the heads 31 and 33 of the pin 26 which engage the outer sides of the arms 18 and 20.

The legs 22 and 24 are engaged with each other and their outer sides are engaged by the arms 18 and 20, respectively, as shown in Figures 3 and 5. The lower ends of the legs 22 and 24 are bevelled, as indicated at 32 and 34, respectively, to provide points 35 adapted to be readily inserted into the grooves, as a stream bank, as shown in Figure 1.

A support bar 38, which occupies a horizontal position while the support is set up, is fixedly pivoted at one end, as indicated at 36, to the upper end of the arm 20 at the side thereof remote from the arm 18. The other end of the bar 38 has a notch 48 on its lower edge which is releasably engageable over a headed pin 46 fixed on and projecting from the upper end of the arm 18 on the side of the arm 38 facing the arm 20, in the extended, unfolded set up condition of the support. The upper edge 40 of the support bar 38 has spaced notches 42 for receiving fishing rods therein.

With the notch 48 disengaged from the pin 46, the arms and legs can be folded into registered overlying relation, as shown in Figure 4, with the free end 39 of the bar 38 overlying the head 33 of the pivot pin 26, as shown in Figure 5.

In Figure 7, another form of support 50 is shown, wherein the arms and legs are integral with each other, as bars, and are pivoted together at their intersection by a pivot pin 58. The lower ends of the leg portions 60 and 62, respectively, are bevelled to provide ground piercing points 69 and 70. Pivoted at 68 to the upper end of the arm portion 64 is one end of a horizontal support bar 38', similar to the bar 38. The free end of the bar 38' is releasably engageable with a fixed pin 46 on the upper end of the arm portion 66, in the manner disclosed in connection with Figures 1 to 6.

When the bar 38' is disengaged from the pin 46, the bars constituting related leg and arm portions, can be folded into registry with each other, with the support bar 38' lying therealong.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. A foldable support comprising two elongated bars in crossed relation, a pivot pin traversing the bars at their intersection, the portions of the bars below the pivot pin being leg portions and the portions of the bars above the pivot pin being arm portions, said leg portions being provided with ground piercing lower ends, said arm portions having upper ends, a horizontal support bar having a first end and a second free end, said support bar extending between the upper ends of the arm portions, the first end of the support bar being fixedly pivoted to the upper end of one arm portion and having a downwardly opening notch in its free end, and a fixed headed pin on the upper end of the other arm portion over which said notch is releasably engaged, said leg portions being separate from the arm portions, the leg portions having upper ends and the arm portions having lower ends, registered longitudinal grooves in the upper and lower ends of said leg portions and arm portions respectively, said grooves being formed in the leg and arm portions so that they indent one side thereof and produce registered longitudinal ribs on the other sides of the leg and arm, the ends of related leg and arm portions being overlapped, a single pivot pin traversing grooves and ribs of overlapped ends and pivoting related leg and arm portions together so that ribs can engage in grooves and releasably retain the leg portions in longitudinal alignment with the related arm portions only in the unfolded condition of the support, end portions of the leg and arm portions being flexible relative to each other and pivotable on said pivot pin for disengaging the ribs from the grooves and enabling folding the leg and arm portions into overlying registered relation to each other, with said support arm in overlying relation thereto.

2. A foldable fishing rod support consisting of two substantially similar elongated vertical bars having upper ends and ground-piercing lower ends, said bars being crossed at points intermediate their ends, the portions of the bars below the crossed points being leg portions and the portions of the bars above the crossed points being arm portions, said leg portions being separate from the arm portions, registered longitudinal grooves in the upper and lower ends of said leg portions and arm portions respectively, a single pivot pin traversing the registered grooves and pivoting the leg and arm portions together at the point of their intersection, a single horizontal bar extending between the upper ends of said arm portions and constituting a fishing rod seat, said horizontal bar having one end securably pivoted on the upper end of one of said arm portions, and means separably securing the other end of the horizontal bar to the upper end of the other arm portion, and rod positioning notch means on said horizontal bar.

References Cited in the file of this patent

UNITED STATES PATENTS

| | | |
|---|---|---|
| 434,286 | Minot | Aug. 12, 1890 |
| 1,261,761 | Bush | Apr. 9, 1918 |
| 1,552,960 | Sanders | Sept. 8, 1925 |

FOREIGN PATENTS

| | | |
|---|---|---|
| 14,246 | Great Britain | July 4, 1908 |